US012618342B1

(12) United States Patent
Sanzari et al.

(10) Patent No.: US 12,618,342 B1
(45) Date of Patent: May 5, 2026

(54) TURBINE EXHAUST CASE WITH STIFFENING BRACE

(71) Applicant: PRATT & WHITNEY CANADA CORP., Longueuil (CA)

(72) Inventors: Lorenzo Sanzari, Montreal (CA); Remy Synnott, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/201,250

(22) Filed: May 7, 2025

(51) Int. Cl.
F01D 25/30 (2006.01)
F02C 3/14 (2006.01)

(52) U.S. Cl.
CPC .............. F01D 25/30 (2013.01); F02C 3/145 (2013.01); F05D 2240/14 (2013.01); F05D 2260/30 (2013.01)

(58) Field of Classification Search
CPC ................................. F01D 25/30; F02C 3/145
See application file for complete search history.

(56) References Cited

U.S. PATENT DOCUMENTS

| | | | |
|---|---|---|---|
| 2,698,872 | A | 1/1955 | Broffitt |
| 3,152,443 | A | 10/1964 | Newland |
| 4,040,249 | A | 8/1977 | Kahle et al. |
| 4,177,638 | A | 12/1979 | Wood |
| 4,765,751 | A * | 8/1988 | Pannone ................ G01K 13/02 |
| | | | 374/135 |
| 6,290,173 | B1 | 9/2001 | Nickels |

| | | | |
|---|---|---|---|
| 8,965,728 | B2 | 2/2015 | Snider et al. |
| 9,157,334 | B2 | 10/2015 | Grede et al. |
| 10,119,449 | B2 | 11/2018 | Boekeloo et al. |
| 10,514,003 | B2 | 12/2019 | Akcayoz et al. |
| 10,697,076 | B2 | 6/2020 | Millward et al. |
| 11,319,897 | B2 * | 5/2022 | Joo ........................... F02K 1/78 |
| 11,719,165 | B2 | 8/2023 | Le Pape et al. |
| 11,840,346 | B2 | 12/2023 | Ozóg |
| 11,905,844 | B2 * | 2/2024 | Kim ....................... F01D 25/30 |
| 12,246,844 | B1 | 3/2025 | Weaver et al. |
| 2024/0150030 | A1 | 5/2024 | Legras et al. |

FOREIGN PATENT DOCUMENTS

| | | | |
|---|---|---|---|
| EP | 3299592 | B1 | 3/2020 |

* cited by examiner

*Primary Examiner* — Sabbir Hasan
(74) *Attorney, Agent, or Firm* — NORTON ROSE FULBRIGHT CANADA LLP

(57) ABSTRACT

An exhaust system for an aircraft engine, has: an exhaust case extending around a central axis and defining openings; exhaust ports secured to the exhaust case and being in register with the openings and protruding away from the exhaust case in a direction having a radial component relative to the central axis, the exhaust ports extending circumferentially around port axes being transverse to the central axis; a turbine exhaust duct (TED) having an annular inlet conduit extending around the central axis for directing combustion gases in an axial direction, and outlet conduits fluidly communicating with the annular inlet conduit and extending generally radially outwardly relative to the annular inlet conduit, the outlet conduits communicating with the openings of the exhaust case and with the exhaust ports; and stiffening braces secured to the exhaust ports and extending across the exhaust ports and in a direction being transverse to the port axes.

20 Claims, 6 Drawing Sheets

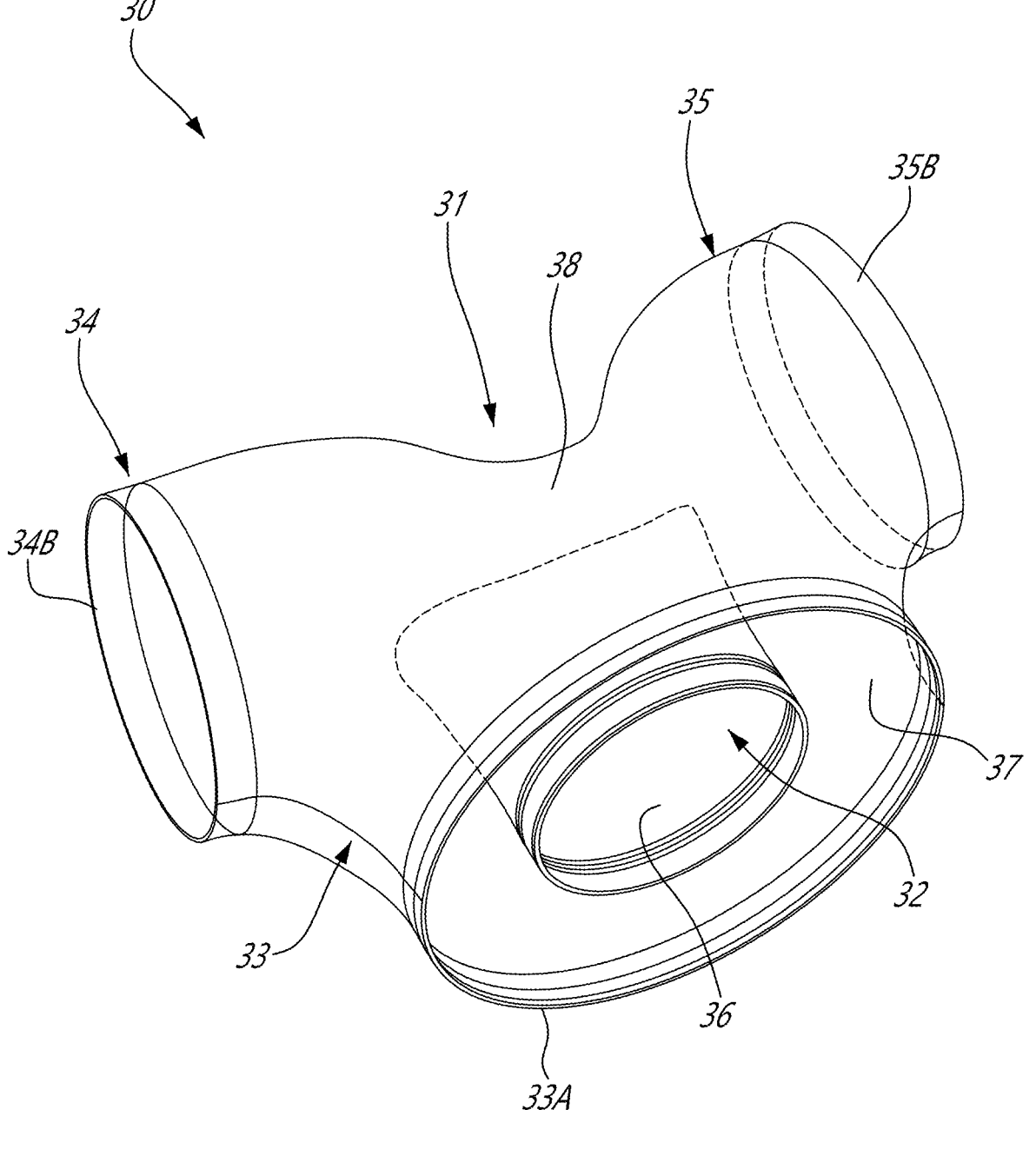
_FIG. 4_

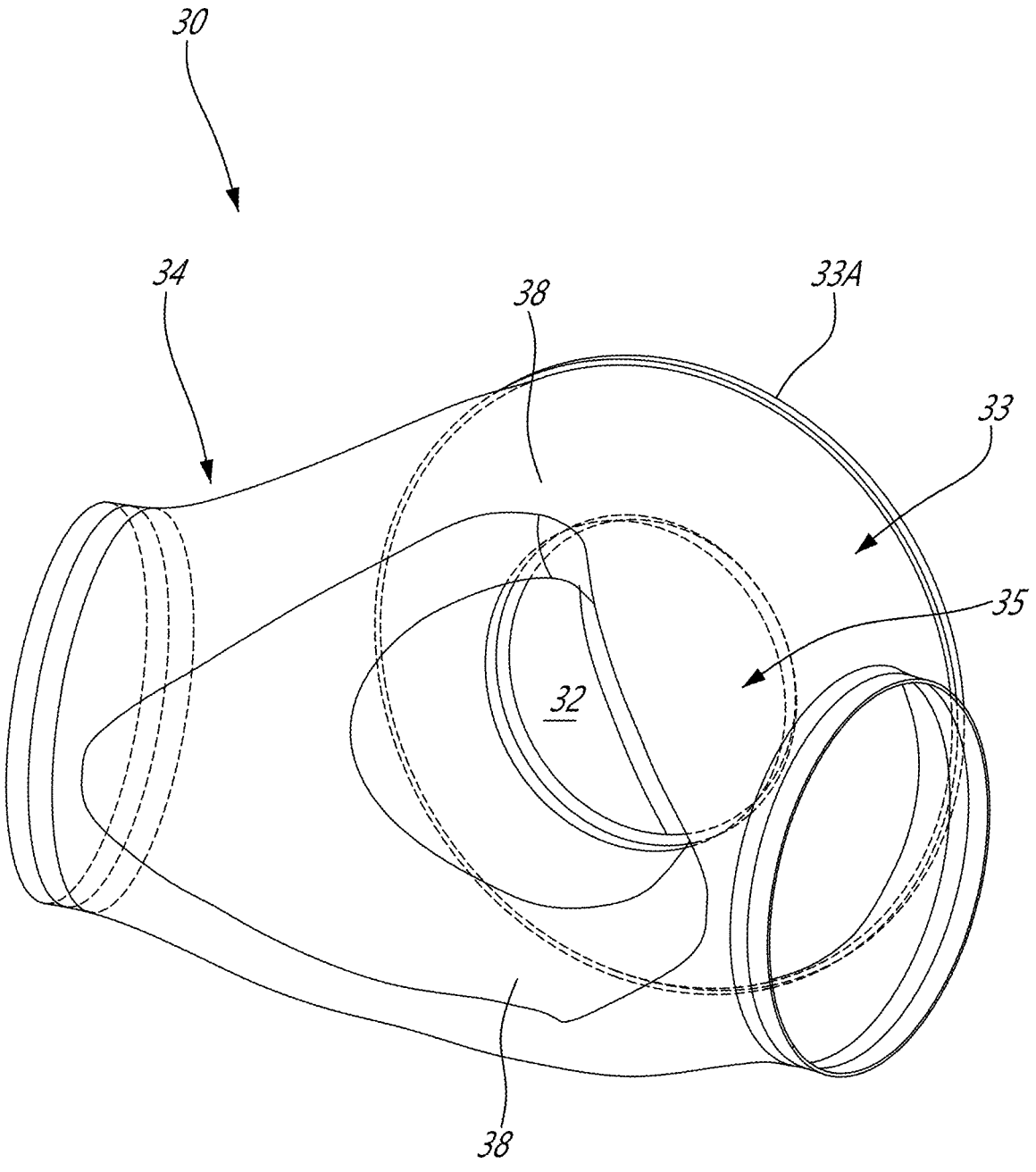
_FIG_5

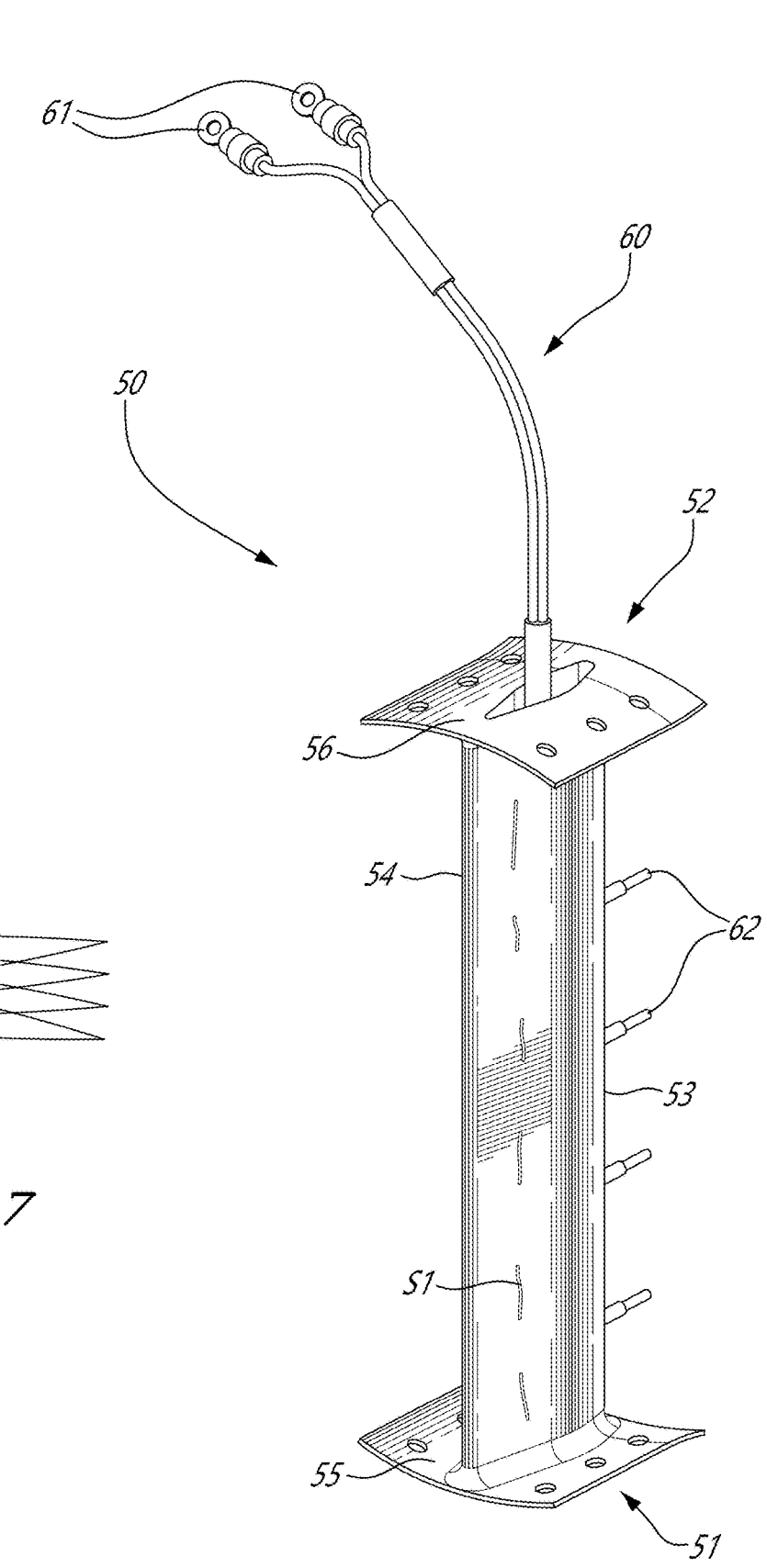

TURBINE EXHAUST CASE WITH STIFFENING BRACE

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. In some configurations, the exhaust ducts structurally supports other components of aircraft engines. Existing exhaust ducts are satisfactory, but improvements are sought.

SUMMARY

In one aspect, there is provided an exhaust system for an aircraft engine, comprising: an exhaust case extending around a central axis and axially between a forward end and a rearward end, the exhaust case defining openings between the forward end and the rearward end; exhaust ports secured to the exhaust case and being in register with the openings, the exhaust ports protruding away from the exhaust case in a direction having a radial component relative to the central axis, the exhaust ports extending circumferentially around port axes being transverse to the central axis; a turbine exhaust duct (TED) having an annular inlet conduit extending around the central axis for directing combustion gases in an axial direction, and outlet conduits fluidly communicating with the annular inlet conduit and extending generally radially outwardly relative to the annular inlet conduit, the outlet conduits communicating with the openings of the exhaust case and with the exhaust ports; and stiffening braces secured to the exhaust ports and extending across the exhaust ports and in a direction being transverse to the port axes.

The exhaust system described above may include any of the following features, in any combinations.

In some embodiments, the stiffening braces intersect the port axes.

In some embodiments, the stiffening braces extend along spans from first ends to second ends both secured to the exhaust ports, the stiffening braces having cross-sectional areas taken on planes being normal to the spans, the cross-sectional areas being airfoil-shaped.

In some embodiments, the cross-sectional areas are symmetrical.

In some embodiments, the stiffening braces twist along the spans such that angle of attacks defined with the combustion gases vary along the spans.

In some embodiments, the stiffening braces extend from leading edges to trailing edges being downstream of the leading edges relative to a direction of the combustion gases, the stiffening braces having chords extending from the leading edges to the trailing edges, the chords being angled to be parallel to a flow direction of exhaust gases exiting the exhaust ports.

In some embodiments, the stiffening braces extend from first ends to second ends along spans, the spans being angled at about 45 degrees relative to the central axis of the exhaust case.

In some embodiments, temperature probes are mounted to the stiffening braces, the probes distributed along spans of the stiffening braces.

In some embodiments, a stiffening brace of the stiffening braces includes a first flange at a first end of the stiffening brace and a second flange at a second end of the stiffening brace, the first flange and the second flange being secured to an exhaust port of the exhaust ports.

In some embodiments, the stiffening braces are secured to the exhaust ports and are free from intersection with the outlet conduits of the TED.

In another aspect, there is provided a reverse-flow gas turbine engine, comprising: an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings; exhaust ports secured to the exhaust case and being in register with the openings, the exhaust ports protruding away from the exhaust case in a direction having a radial component relative to the central axis, the exhaust ports extending circumferentially around port axes being transverse to the central axis; a turbine exhaust duct (TED) having an annular inlet conduit extending around the central axis for directing combustion gases in an axial direction, and outlet conduits fluidly communicating with the annular inlet conduit and extending generally radially outwardly relative to the annular inlet conduit, the outlet conduits communicating with the openings of the exhaust case and with the exhaust ports; and stiffening braces secured to the exhaust ports at opposite locations on the exhaust ports.

The reverse-flow gas turbine engine described above may include any of the following features, in any combinations.

In some embodiments, the stiffening braces intersect the port axes.

In some embodiments, the stiffening braces extend along spans from first ends to second ends both secured to the exhaust ports, the stiffening braces having cross-sectional areas taken on planes being normal to the spans, the cross-sectional areas being airfoil-shaped.

In some embodiments, the cross-sectional areas are symmetrical.

In some embodiments, the stiffening braces twist along the spans such that angle of attacks defined with the combustion gases vary along the spans.

In some embodiments, the stiffening braces extend from leading edges to trailing edges being downstream of the leading edges relative to a direction of the combustion gases, the stiffening braces having chords extending from the leading edges to the trailing edges, the chords being angled to be parallel to a flow direction of exhaust gases exiting the exhaust ports.

In some embodiments, the stiffening braces extend from first ends to second ends along spans, the spans being angled at about 45 degrees relative to the central axis of the exhaust case.

In some embodiments, temperature probes are embedded in the stiffening braces, the probes distributed along spans of the stiffening braces.

In some embodiments, a stiffening brace of the stiffening braces include a first flange at a first end of the stiffening brace and a second flange at a second end of the stiffening brace, the first flange and the second flange being secured to an exhaust port of the exhaust ports.

In some embodiments, the stiffening braces are secured to the exhaust ports and are free from intersection with the outlet conduits of the TED.

DESCRIPTION OF THE DRAWINGS

Reference is now made to the accompanying figures in which:

FIG. 4 is a three dimensional view of a turbine exhaust duct of the exhaust system of FIG. 2;

FIG. 5 is another three dimensional view of the turbine exhaust duct of FIG. 4;

FIG. 6 is a three-dimensional view of one of the stiffening braces of the exhaust system of FIG. 2; and FIG. 7 is a plan view illustrating a plurality of cross-sectional views of a stiffening brace in accordance with another embodiment.

DETAILED DESCRIPTION

Figure 1:
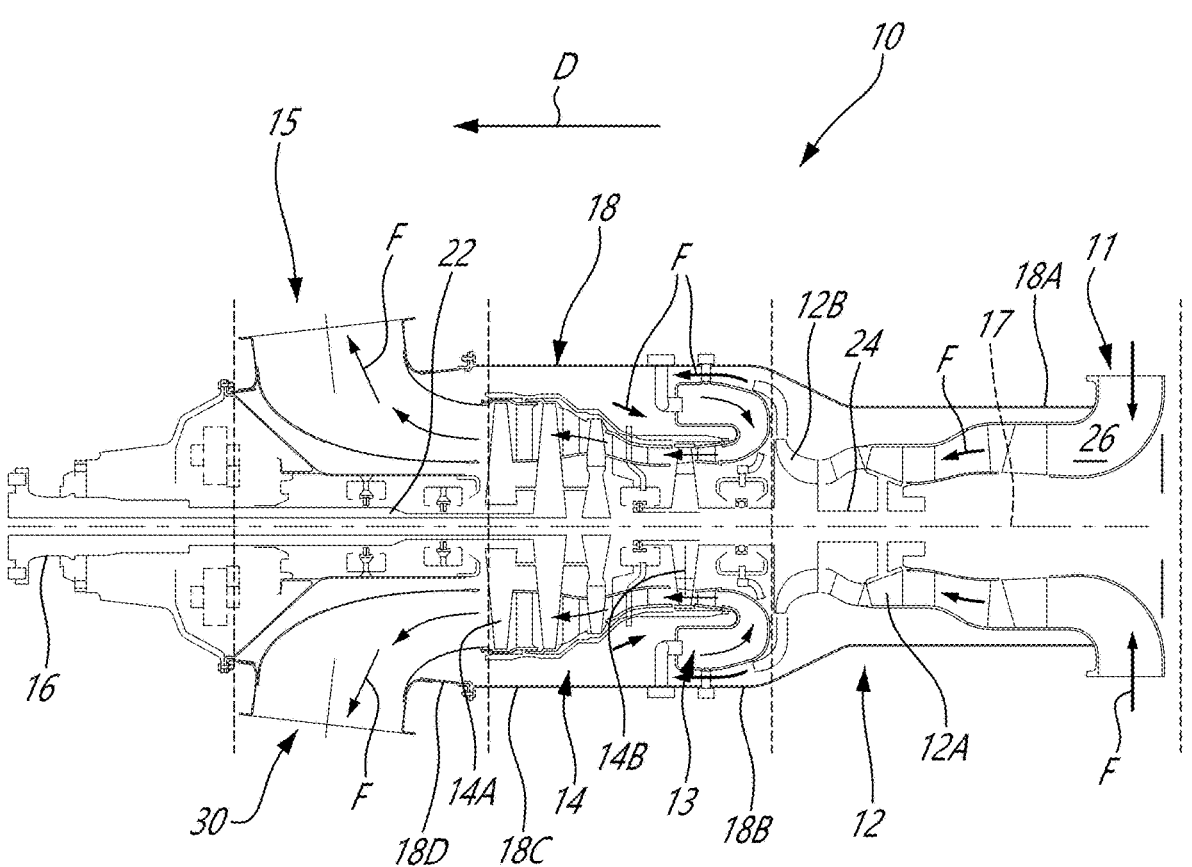
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) spool rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 2:
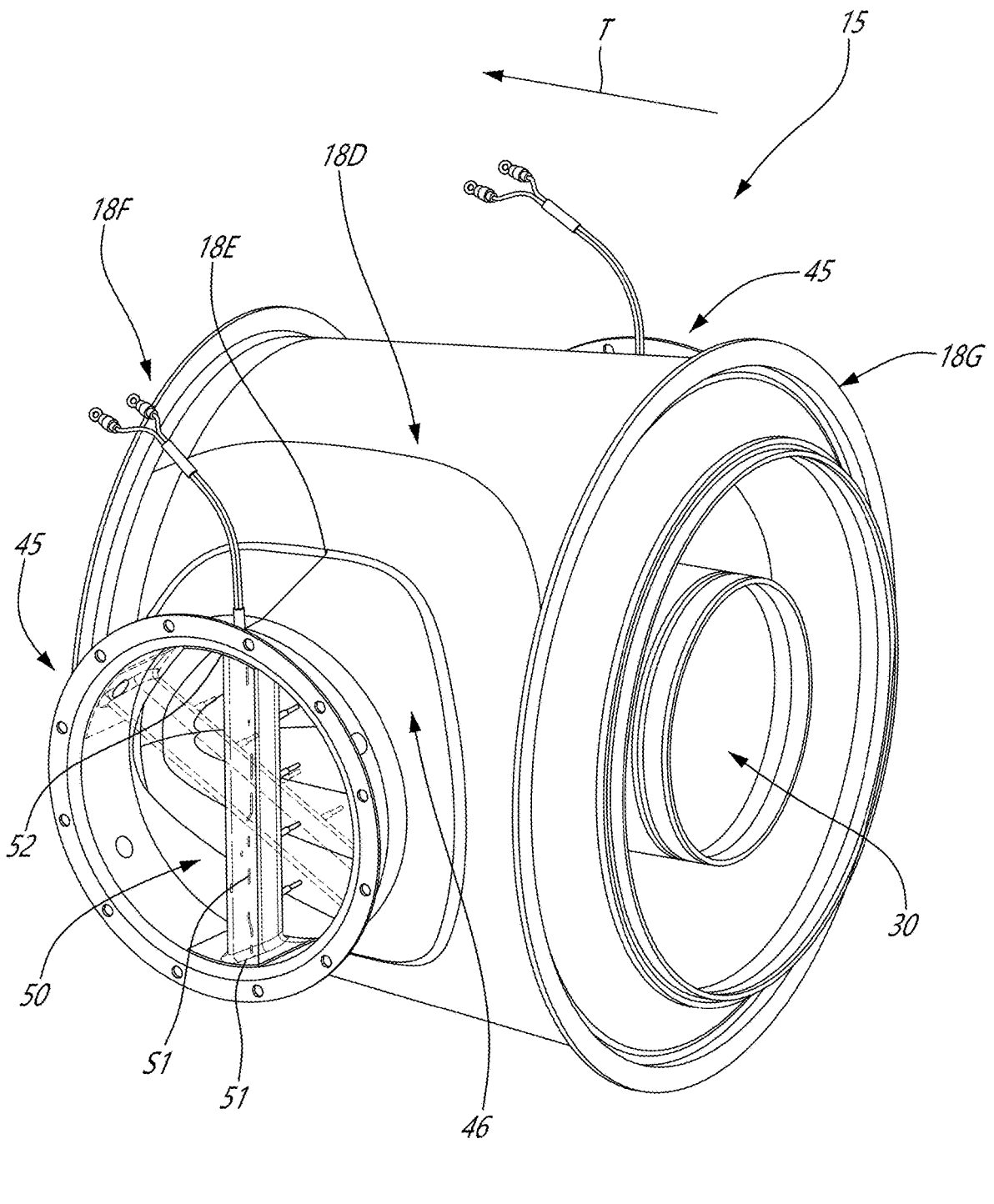
FIG. 2 is a three dimensional view of an exhaust system of the aircraft engine of FIG. 1.
Figure 3:
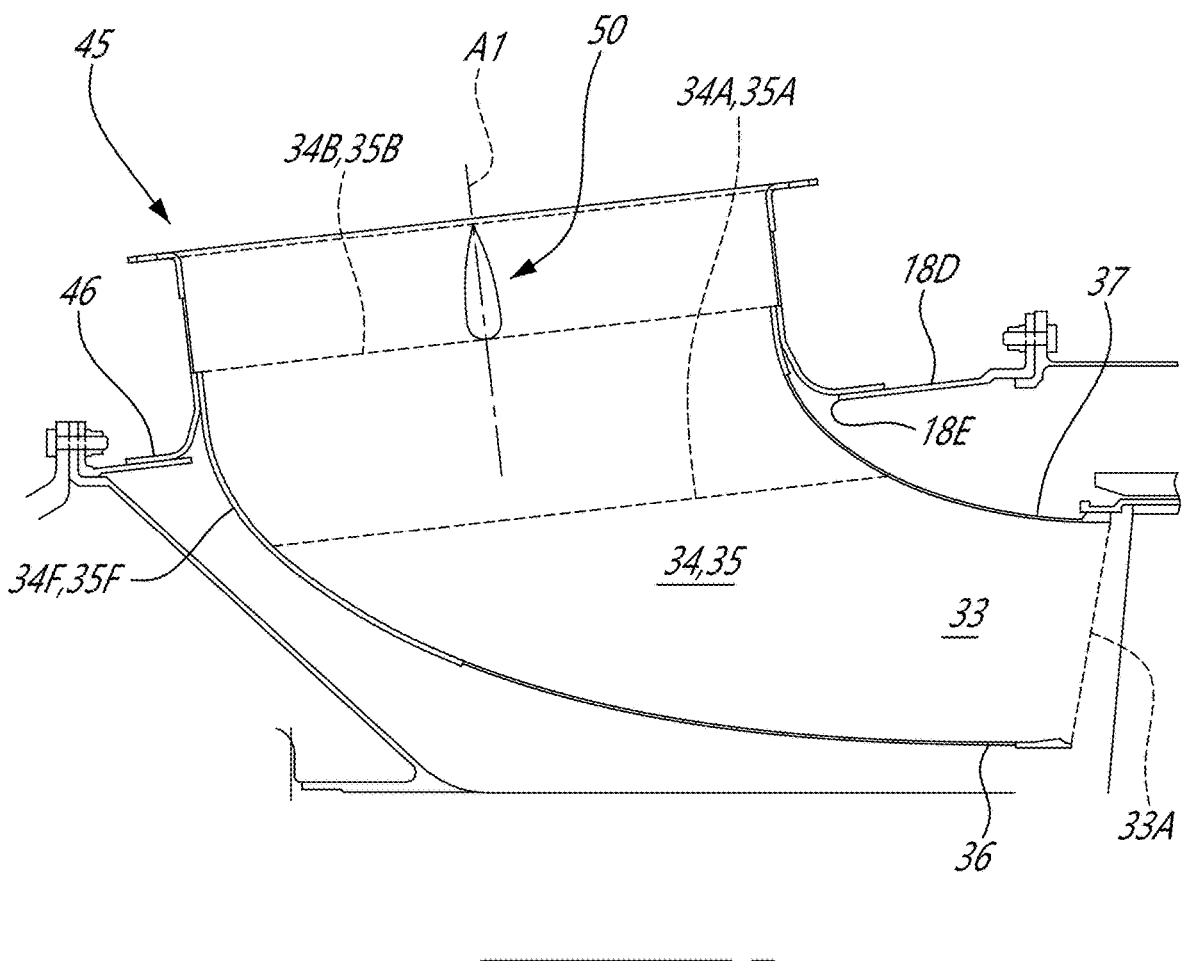
FIG. 3 is a cross-sectional view of the exhaust system of FIG. 2 including stiffening braces.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Referring now to FIG. 4, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e. the exhaust flow discharged from the exhaust duct is not axial, it is rather directed in a direction that diverges from the central axis 17). According to at least some embodiments, the TED 30 has a generally "Y-shaped" body 31 including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit 34, 35 projects outwardly of the exhaust case 18D. As best shown in FIG. 3, each outlet conduit 34, 35 terminates into an exhaust port. The outlet conduits extend along respective axes that intersect the central axis 17. According to the illustrated embodiment, these axes has a main radial component and a secondary (i.e., smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g. oval).

Referring to FIGS. 3-5, the turbine exhaust duct 30, in this embodiment is a dual ports exhaust duct, and is formed by a generally Y-shaped body 31. The body 31 of the turbine exhaust duct 30 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e., be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet center-lines which extend at an angle relative to each other. As shown in FIGS. 3 and 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

Still referring to FIGS. 4-5, the outer peripheral wall 37 and the inner peripheral wall 36 are connected to one another at the outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

Inventors of the present disclosure have found that the stiffness of the exhaust case 18D is affected by the openings 18E defined therethrough for receiving the outlet conduits 34, 35 of the turbine exhaust duct 30. In other words, overall hoop stress in the exhaust case 18D is increased due to the presence of those openings 18E. On the other hand, the exhaust case 18D supports other components of the gas turbine engine 10, such as a reduction gearbox, propeller, and so on. Moreover, typically temperature probes are disposed circumferentially around the openings 18E to measure temperature of the exhaust gases to determine temperature in the turbine section of the gas turbine engine 10. The circumferential distribution may yield inaccurate measurements in some configurations since a flow distribution of the combustion gases exiting the gas turbine engine 10 may be non-axisymmetric and may present hot spots that may be missed by those probes. As will be seen hereinafter, embodiments of the exhaust system 15 described herein may at least partially alleviate these drawbacks.

Referring to FIGS. 2-3, the exhaust system 15 further includes exhaust ports 45 secured to the exhaust case 18D and being in register with the openings 18E, which are located between forward and rearward ends 18F, 18G of the exhaust case 18D relative to the direction of travel T. The exhaust ports 45 protrude away from the exhaust case 18D in a direction having a radial component relative to the central axis 17. The exhaust ports 45 each extend circumferentially around port axes A1 (FIG. 3) that are transverse to the central axis 17. As illustrated, the exhaust ports 45 are secured to the exhaust case 18D via fairings 46 that bridge gaps defined between peripheries of the openings 18E and the exhaust ports 45.

To reinforce the exhaust case 18D, the exhaust system 15 further includes stiffening braces 50 secured to the exhaust ports 45 and extending across the exhaust ports 45 and in a direction being transverse to the port axes A1. Put differently, the stiffening braces 50 may be secured to the exhaust ports 45 at opposite locations on the exhaust ports 45. The stiffening braces 50 may be secured solely to the exhaust ports 45 while being free from intersection with the outlet conduits 34, 35 of the TED 30. In some embodiments, the stiffening braces 50 may be secured to the exhaust ports 45 via other components, such as the outlet conduits 34, 35. The stiffening braces 50 may intersect the port axes A1 such that they intersect centers of the outlet conduits 34, 35. They may alternatively be offset from the centers of the conduits 34, 35 in some embodiments.

In FIG. 2, one example of the stiffening braces 50 is illustrated and extends from a first end 51 to a second end 52 along a span S1. The span S1 may be angled at about 90 degrees relative to the central axis 17 of the exhaust case 18D. In other words, although these the spans S1 and the central axis 17 do not intersect one another, a projection of the span S1 on a plane containing the central axis 17 and being parallel to the span S1 would intersect the central axis 17 at about 90 degrees. Herein, the expression "about" implies variations of plus or minus 10%. In alternate embodiments, the angle between the span S1 and the central axis 17 may be about 45 degrees as shown with dashed lines in FIG. 2. The angle may be selected to obtain the desired stiffness based on the configuration in which the brace is being used. In this configuration, the span S1 extends upwardly and towards the forward end 18F of the exhaust case 18D relative to the direction of travel T from the first end 51 to the second end 52. Herein, the expression "upwardly" refers to a direction in relation to gravity.

Referring now to FIG. 6, one of the braces 50 is shown in greater detail. As best shown in FIG. 3, the exemplary stiffening brace 50 shown in FIG. 6 has a cross-sectional area taken on a plane being normal to the span S1; the cross-sectional area being airfoil-shaped. The airfoil of the stiffening brace 50 may be symmetrical. That is, the stiffening brace 50 has a leading edge 53 and a trailing edge 54 opposite the leading edge 53 and interconnected to the leading edge 53 via a chord. The airfoil is symmetrical relative to a plane parallel to the span S1 and containing the chord of the airfoil. The chords are angled to be parallel to a flow direction of exhaust gases exiting the exhaust ports 45 to minimize pressure drops.

In the embodiment shown, the stiffening brace 50 includes a first flange 55 at the first end 51 and a second flange 56 at the second end 52. The first and second flanges 55, 56 are used to secure the stiffening brace 50 to the exhaust port 45. In this embodiment, fasteners such as rivets or bolts may be used and apertures are defined through the flanges to receive those fasteners. Other fastening means may be used, such as brazing and welding.

The stiffening braces 50 may be hollow to receive a probe assembly 60 including connectors 61 to be connected to a controller of the gas turbine engine 10 and probes 62 distributed longitudinally along the span S1. Hence, the probes 62 may be said to be distributed along a radial direction relative to the port axis A1, which is transverse to the span S1. This is in contrast to the circumferential distribution discussed above. Hence, the present distribution of probes 62 may allow to obtain a better representation of the temperature distribution of the exhaust gases exiting the exhaust ports 45. The probes 62 of this configuration protrude from the leading edge 53 of the stiffening brace 50 and away from both of the leading and trailing edge 53, 54. These probes 62 thus face the incoming flow of the combustion gases.

Referring now to FIG. 7, an alternate configuration of the stiffening brace is shown at 150. In this embodiment, the stiffening brace 150 twists along its span S1. This is represented in FIG. 7 with a plurality of cross-sections of the stiffening brace 50 at a plurality of span-wise locations showing the relative angles between these sections. The twist exhibited by this configuration may ensure that the stiffening braces 50 remains substantially streamlined or aligned with the incoming flow direction to minimize drag and pressure drops through the exhaust ports 45. In other words, the twist may enable to ensure the same angle of attack with the incoming flow regardless of the spanwise position on the brace.

The disclosed configuration of at least some of the embodiments of the stiffening braces 50, 150 may significantly increases stiffness of the exhaust case 18D with minimal weight addition, may be installed in various orientations to optimize stiffness in the desired direction, features an aerodynamic contoured shape that may direct gases at optimal angle to improve flow and enhance engine efficiency and performance, may serve as a reinforcement element for tuning and controlling dynamic vibrations, and may provide a more precise understanding of heat distribution throughout the engine, thereby enhancing overall engine efficiency and prolonging the lifespan of its components.

As aforementioned, the exhaust case 18D is subjected to substantial loads since it carries a gearbox at its forward end. Having the stiffening braces extending across the openings of the exhaust case 18D may substantially increase the stiffness and may alleviate some drawbacks that may be caused by the loads the exhaust case 18D is subjected to during operations of the gas turbine engine 10. The stiffening braces may be suitably oriented to maximize their impact on the stiffness of the exhaust case 18D while also minimizing their weight.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust system for an aircraft engine, comprising:
an exhaust case extending around a central axis and axially between a forward end and a rearward end, the exhaust case defining openings between the forward end and the rearward end;
exhaust ports secured to the exhaust case and being in register with the openings, the exhaust ports protruding away from the exhaust case in a direction having a radial component relative to the central axis, the exhaust ports extending circumferentially around port axes being transverse to the central axis;
a turbine exhaust duct (TED) having an annular inlet conduit extending around the central axis for directing combustion gases in an axial direction, and outlet conduits fluidly communicating with the annular inlet conduit and extending generally radially outwardly relative to the annular inlet conduit, the outlet conduits communicating with the openings of the exhaust case and with the exhaust ports; and
stiffening braces secured to the exhaust ports and extending across the exhaust ports and in a direction being transverse to the port axes.

2. The exhaust system of claim 1, wherein the stiffening braces intersect the port axes.

3. The exhaust system of claim 1, wherein the stiffening braces extend along spans from first ends to second ends both secured to the exhaust ports, the stiffening braces having cross-sectional areas taken on planes being normal to the spans, the cross-sectional areas being airfoil-shaped.

4. The exhaust system of claim 3, wherein the cross-sectional areas are symmetrical.

5. The exhaust system of claim 3, wherein the stiffening braces twist along the spans such that angle of attacks defined with the combustion gases vary along the spans.

6. The exhaust system of claim 1, wherein the stiffening braces extend from leading edges to trailing edges being downstream of the leading edges relative to a direction of the combustion gases, the stiffening braces having chords extending from the leading edges to the trailing edges, the chords being angled to be parallel to a flow direction of exhaust gases exiting the exhaust ports.

7. The exhaust system of claim 1, wherein the stiffening braces extend from first ends to second ends along spans, the spans being angled at about 45 degrees relative to the central axis of the exhaust case.

8. The exhaust system of claim 1, comprising temperature probes mounted to the stiffening braces, the probes distributed along spans of the stiffening braces.

9. The exhaust system of claim 1, wherein a stiffening brace of the stiffening braces includes a first flange at a first end of the stiffening brace and a second flange at a second end of the stiffening brace, the first flange and the second flange being secured to an exhaust port of the exhaust ports.

10. The exhaust system of claim 1, wherein the stiffening braces are secured to the exhaust ports and are free from intersection with the outlet conduits of the TED.

11. A reverse-flow gas turbine engine, comprising:
an outer case assembly extending around a central axis and enclosing a core, the core including a compressor section, a combustor, and a turbine sectioned, the turbine section located forward of the combustor and of the compressor section relative to a direction of travel of the reverse-flow gas turbine engine, the outer case assembly including an exhaust case extending around the central axis and axially between a forward end and a rearward end, the exhaust case defining openings between the forward end and the rearward end;
exhaust ports secured to the exhaust case and being in register with the openings, the exhaust ports protruding away from the exhaust case in a direction having a radial component relative to the central axis, the exhaust ports extending circumferentially around port axes being transverse to the central axis;
a turbine exhaust duct (TED) having an annular inlet conduit extending around the central axis for directing combustion gases in an axial direction, and outlet conduits fluidly communicating with the annular inlet conduit and extending generally radially outwardly relative to the annular inlet conduit, the outlet conduits communicating with the openings of the exhaust case and with the exhaust ports; and
stiffening braces secured to the exhaust ports at opposite locations on the exhaust ports, the stiffening braces extending across the exhaust ports transversally to the port axes.

12. The reverse-flow gas turbine engine of claim 11, wherein the stiffening braces intersect the port axes.

13. The reverse-flow gas turbine engine of claim 11, wherein the stiffening braces extend along spans from first ends to second ends both secured to the exhaust ports, the stiffening braces having cross-sectional areas taken on planes being normal to the spans, the cross-sectional areas being airfoil-shaped.

14. The reverse-flow gas turbine engine of claim 13, wherein the cross-sectional areas are symmetrical.

15. The reverse-flow gas turbine engine of claim 13, wherein the stiffening braces twist along the spans such that angle of attacks defined with the combustion gases vary along the spans.

16. The reverse-flow gas turbine engine of claim 11, wherein the stiffening braces extend from leading edges to trailing edges being downstream of the leading edges relative to a direction of the combustion gases, the stiffening braces having chords extending from the leading edges to the trailing edges, the chords being angled to be parallel to a flow direction of exhaust gases exiting the exhaust ports.

17. The reverse-flow gas turbine engine of claim 11, wherein the stiffening braces extend from first ends to second ends along spans, the spans being angled at about 45 degrees relative to the central axis of the exhaust case.

18. The reverse-flow gas turbine engine of claim 11, comprising temperature probes embedded in the stiffening braces, the probes distributed along spans of the stiffening braces.

19. The reverse-flow gas turbine engine of claim 11, wherein a stiffening brace of the stiffening braces include a first flange at a first end of the stiffening brace and a second flange at a second end of the stiffening brace, the first flange and the second flange being secured to an exhaust port of the exhaust ports.

20. The reverse-flow gas turbine engine of claim 11, wherein the stiffening braces are secured to the exhaust ports and are free from intersection with the outlet conduits of the TED.

\* \* \* \* \*